March 9, 1965 R. E. MASON ETAL 3,172,724
PRODUCTION OF STANNOUS FLUORIDE
Filed Dec. 20, 1963
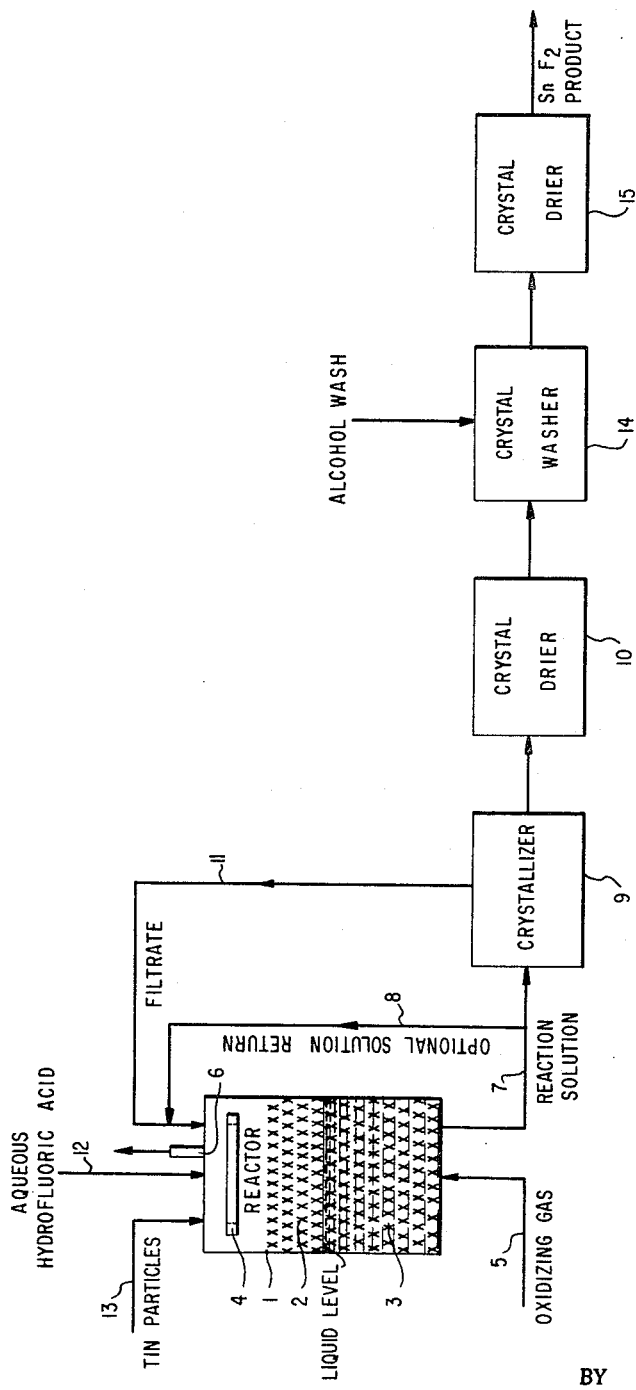
INVENTORS
RALPH EDWIN MASON
HAROLD PAUL WILSON
BY
ATTORNEYS 3,172,724
PRODUCTION OF STANNOUS FLUORIDE
Ralph Edwin Mason, Cranford, N.J., and Harold Paul Wilson, Sewickley, Pa., assignors to Vulcan Materials Company, Sewaren, N.J., a corporation of New Jersey
Filed Dec. 20, 1963, Ser. No. 332,156
9 Claims. (Cl. 23—88)

The invention relates to the preparation of stannous fluoride. More particularly, the invention relates to an improved process for producing stannous fluoride by reacting metallic tin with aqueous hydrofluoric acid.

Stannous fluoride has been produced in the past largely by the reaction of stannous oxide and aqueous hydrofluoric acid. It has been known for many years that it is also possible to produce stannous fluoride by the reaction of metallic tin and hot aqueous hydrofluoric acid. Such a reaction has, however, even at temperatures elevated to the point of distillation proved to be very slow, and of low yield, and of very limited practical interest. Certain recently proposed processes employing metallic tin and hydrofluoric acid have given satisfactory yields when the hydrofluoric acid is anhydrous or contains a concentration of hydrofluoric acid greater than about fifty percent. Such recent processes, however, have been ineffective when more dilute concentrations of aqueous hydrofluoric acid are reacted with metallic tin.

It is an object of the present invention to provide an improved, efficient, and economical process for the high yield production of stannous fluoride.

It is another object of the invention to provide an improved process for the production of stannous fluoride by the reaction of metallic tin with aqueous hydrofluoric acid which may contain less than fifty percent hydrogen fluoride.

These and other objects, as well as the scope, nature, and utilization of the invention will become more clearly apparent from the following description and appended claims.

The drawing illustrates a schematic flow diagram of the inventive process showing an apparatus arrangement best adapted for the production of stannous fluoride.

It has now been discovered that high purity crystalline stannous fluoride may be readily produced at moderate temperatures in the presence of air or gaseous oxygen and excess of "mossy" tin metal or tin metal forms having a relatively large surface area.

In carrying out the invention, aqueous hydrofluoric acid is reacted in either a batch or a continuous process with a stoichiometric excess of tin particles at about atmospheric or elevated pressures, e.g., about 0 to 50 p.s.i.g. while the reaction mixture undergoes aeration by an oxygen supplying oxidizing agent which will not contaminate the product.

It will be understood that all proportions and quantities of materials are expressed herein on a weight basis unless otherwise indicated.

The aqueous hydrofluoric acid initially employed in the process may be formed by dissolving hydrogen fluoride gas in water to form an aqueous acid containing approximately 10 to 45 percent and preferably 20 to 35 percent HF. Within the above concentration range the stannous fluoride formed in the process will tend to retain substantial solubility within the hydrofluoric acid. Maximum stannous fluoride solubility is obtained in aqueous hydrofluoric acid containing about 20 to 35 percent HF. When acid concentrations exceeding about 45 percent HF are employed, the stannous fluoride formed tends to precipitate within the reaction vessel. By maintaining a reaction medium in which the stannous fluoride product formed is soluble the reactive tin surfaces do not tend to become masked by the deposits of insoluble product, and it is possible for the reaction to proceed to a high product yield. A similarly high yield may also be accomplished even though the hydrogen fluoride content of the acid exceeds 45 percent, but in such a case the solution containing stannous fluoride product must be continuously removed from the reaction vessel as it is formed, and stannous fluoride removed prior to recycling of the solution into the reactor.

Commercially available grades of metallic tin, e.g., grade A tin, may be effectively employed in the process of this invention. It is desirable that the tin metal be divided so as to expose a large reactive surface area, while maintaining adequate openings within the mass of tin particles so that circulation of liquids and gases through the reactive mass may be readily accomplished. Tin particles having a specific surface area of at least about 0.1 cm.$^2$ and preferably between about 0.5 and 15 cm.$^2$ per gram may satisfactorily be used. While "mossy" tin metal may be used in the present process, it has been found that circulation within the reaction vessel may be improved by using tin particles of configurations which will allow more free space between the metal particles. For example, strips of grade A tin may be bent so that a maximum area is exposed. For instance, tin having a thickness of about 2 mm. may be cut into small strips approximately 1 cm. by 4 cm. and bent into a ringlike configuration so that the ends of the strip nearly touch. Numerous other configurations for the metallic tin meeting the above mentioned preferred prerequisites may be employed with equal success in the present process.

Molecular oxygen supplying oxidizing agents which will not contaminate the product may be employed in the present process, with air being the most obvious example of such an agent. The oxygen may also be supplied from sources other than air, such as by controlled use of gaseous oxygen, ozone, or hydrogen peroxide.

While the basic reaction involved in the present process is considered to be complex and incapable of simple explanation, it would appear that the molecular oxygen supplied by the oxidizing agent combines at the surface of the tin metal with hydrogen from the hydrofluoric acid to form water and thus permits the reaction to produce stannous fluoride in good yield. Such a reaction may be represented as follows:

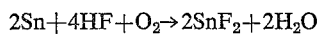
$$2Sn+4HF+O_2 \rightarrow 2SnF_2+2H_2O$$

Satisfactory batch applications of the present process may be conducted by filling approximately one-half of a suitable reaction vessel 1, e.g., a polyethylene lined steel reactor with divided tin particles or tin forms 2 having a high ratio of surface area to weight and allowing sufficient free space for efficient circulation of solution. Next the tin particles are partially covered with a quantity of suitable aqueous hydrofluoric acid 3. For example, about 75 percent of the tin forms may be covered by the aqueous acid. Immediately above the tin forms a cooling coil 4 is provided in order to condense and reflux any hydrogen fluoride gas which may be evolved when the reaction gets underway. The temperature of the reaction vessel is adjusted so that the solution attains a temperature from about room temperature up to the boiling point of the aqueous solution, which may be approximately 110–115° C. depending on the specific hydrogen fluoride concentration of the acid. A solution temperature from about 60° C. up to near the boiling point of the solution or a temperature of approximately 70° C. in the vapor space immediately above the tin particles has been found to produce an excellent yield of product. Heat may be externally supplied to the reactor by any suitable means such as by a steam collar.

The oxygen supplying oxidizing gas may be introduced below the surface level of the aqueous hydrofluoric acid near the bottom of the reactor by means of conduit 5. The oxygen supplied is sparged into the reactor at a rate exceeding the stoichiometric requirement on the basis of product yield time rate and the reaction is allowed to proceed until the concentration of free hydrogen fluoride in terms of free hydrogen fluoride and water present is lowered to about 10 percent. While the reaction is in progress waste air or other oxidizing gas is exhausted through an opening 6 in the reaction vessel above the cooling coil.

During the reaction in a batch process the quantity of stannous fluoride formed and dissolved within the solution rises at a relatively steady rate, e.g., to approximately 35 percent in a reaction time of about 5 to 7 hours. Stannic fluoride is also formed in the process, but its concentration in the acid solution usually remains below approximately 5 percent, and often tends to drop toward the end of the reaction.

Once the reaction mixture has reached about the minimum operable hydrogen fluoride concentration, i.e., about 10 percent, the recovery of the stannous fluoride product may be improved by terminating the flow of oxidizing gas within the vessel and sparging into the reactor through conduit 5 an inert gas, such as nitrogen or argon, to permit the reduction of any oxyfluorides present and to help to lower the concentration of stannic fluoride by the reducing action of the tin metal in the presence of free hydrogen fluoride. Alternate procedures include terminating the flow of oxidizing gas and steeping the hot solution with a large mass of submerged "mossy" tin or tin particles, or percolating the hot solution slowly through a submerged bed of "mossy" tin or tin particles by means of conduits 7 and 8.

The stannous fluoride product is next recovered from the solution in which it is dissolved. Recovery is efficiently effected by draining the hot solution through conduit 7 from the tin metal and cooling the solution to approximately 4° C. to crystallize out anhydrous stannous fluoride crystals in crystallizer 9. Particularly good yields are obtained from the hot product solution by evaporative cooling in a vacuum crystallizer.

The crystals are dried in a suitable drier 10, such as by vacuum draining in a filtering apparatus, or by centrifugal action. The filtrate obtained contains the major portion of the stannic fluoride formed during the reaction.

When the process is operated on a continuous basis, the filtrate containing aqueous hydrofluoric acid and stannic fluoride may be continuously recycled to the reactor by means of conduit 11, along with fresh aqueous hydrofluoric acid 12, make-up tin 13 usually being added to the reactor intermittently.

To improve the purity of the product the stannous fluoride crystals may be washed in a crystal washer 14 with a substantially anhydrous $C_1$ to $C_3$ alkanol such as methanol, ethanol, n-propanol, or isopropanol, with isopropanol being preferred. Very little stannous or stannic fluoride is dissolved in the alcohol wash filtrate, but even this small quantity may be recovered from the alcohol by distillation if desired. If the drying of the crystals is conducted in a very efficient manner, then the alcohol wash step may be omitted.

The stannous fluoride crystals are again dried in a vacuum (e.g., 25 in. Hg) in crystal drier 15 at a moderate temperature below the melting point of the crystals, e.g., at about 100° C., to remove the anhydrous alcohol wash solution.

The product anhydrous stannous fluoride crystals have excellent crystallinity and a pure white color. Upon dissolution in distilled water a clear colorless solution is formed indicating little or no oxyfluoride content. High quality product can be formed by the present process at a purity greater than 99.8 percent stannous fluoride. Average runs of the process produce crystals containing at least 99 to 99.5 percent stannous fluoride and about 0.5 to 1 percent stannic fluoride.

Various additional modifications of the basic process may be employed. For instance, hot aqueous hydrofluoric acid may be recycled or pumped around from the bottom to the top of the reactor by means of conduits 7 and 8 and percolated or filtered through the exposed metallic tin particles prior to reaching the body of liquid wherein about one-half of the tin particles present are submerged. In a process wherein downward flow of liquid is practiced, the oxygen supplying oxidizing agent, which is introduced below the surface of the solution, will flow through the tin countercurrent to the liquid flow.

Due to the highly corrosive properties of the hydrogen fluoride, care must be taken to use non-corroding materials throughout the reaction system, such as polyethylene, polypropylene, or polytetrafluoroethylene.

The following example is given as a specific illustration of the present invention. It should be understood, however, that the invention is not limited to the specific details set forth in the illustration.

*Example*

A one gallon polypropylene bottle was placed in a large metal vessel partially filled with triethylene glycol, to permit external heating. A polyethylene tube of small diameter was placed in the center of the bottle so that an air supply could be delivered to near the bottom of the reaction vessel. In the upper space of the vessel a coil of polyethylene tubing was provided through which tap water was allowed to circulate in order to reflux and condense any vapors evolved during the reaction.

The reaction vessel was partially filled with 4,500 grams of tin metal rings which occupied 2,074 ml. or approximately 55% of the total space in the reactor. The rings were formed from strips of reagent grade tin metal 4 cm. long, 1 cm. wide, and 2 mm. thick by bending them until the ends nearly touched. The initial unit weight of each such ring was 6.67 grams. The average bulk density was 2.17 grams per ml., and the specific surface area was 1.5 cm.$^2$ per gram.

A quantity of aqueous hydrofluoric acid analyzing 26.6 percent hydrogen fluoride and weighing 1,203 grams was added to the tin metal. The acid filled approximately 76 percent of the net bulk volume of the tin rings, leaving about 24 percent of the tin surface exposed initially to the gas phase.

The reactor was heated and the vapor temperature immediately above the tin rings was maintained at 73±10° C. The reaction was considered to commence when air was sparged into the reactor at a rate exceeding the stoichiometric oxygen requirement based on the stannous fluoride yield time rate. The aeration lasted 630 minutes. Nitrogen gas was then substituted for air for an additional 75 minutes.

In 680 minutes the reaction produced 580 grams of stannous fluoride and 81 grams of stannic fluoride. The tin consumption was found to be 490 grams. The concentration of stannous fluoride in the solution rose to 32.8 percent, while the free hydrogen fluoride concentration in terms of water and hydrogen fluoride present in the solution dropped from 26.6 percent to 12.6 percent. The concentration of stannic fluoride in the solution did not exceed 5.73 percent.

The final solution was decanted from the tin rings to a polyethylene vessel and cooled to approximately 4° C. to crystallize out the stannous fluoride product. The stannous fluoride crystals were vacuum dried and then washed with anhydrous isopropanol. The alcohol-washed crystals were then vacuum dried below their melting point, e.g., at a temperature of about 100° C.

The yield of dry stannous fluoride crystals was 62 percent of the stannous fluoride available in the final solution. The product analyzed 99.0 percent stannous fluoride and 0.72% stannic fluoride.

The stannous fluoride product obtained may be used as an additive for dentifrices, as well as in halogen electroplating baths which are commonly used for plating tin on strip steel, etc.

Having thus fully described our invention, what we claim is:

1. A process for the production of stannous fluoride comprising contacting aqueous hydrofluoric acid containing about 10 to 45 percent HF with an excess of metallic tin in a form having a specific surface area of at least about 0.1 cm.$^2$ per gram at a temperature between about room temperature and the boiling point of the solution, passing a molecular oxygen supplying gas through said acid in the presence of said tin, and separating stannous fluoride from the resulting acid solution.

2. A process according to claim 1 wherein anhydrous stannous fluoride is recovered by draining said acid solution from the metallic tin and crystallizing the product.

3. A process according to claim 1 wherein the molecular oxygen supplying gas is air.

4. A process according to claim 1 wherein the molecular oxygen supplying gas is oxygen.

5. A process according to claim 1 wherein the molecular oxygen supplying gas is ozone.

6. A process for the production of stannous fluoride which comprises partially immersing a stoichiometric excess of metallic tin shapes having a specific surface area between about 0.5 and 15 cm.$^2$ per gram in aqueous hydrofluoric acid containing about 20 to 35 percent HF in a reaction zone, maintaining said acid in said reaction zone at a temperature between about 60° C. and the boiling point of the mixture and at a pressure between about 0 and 50 p.s.i.g., introducing air below the surface level of said acid in the presence of said tin, cooling and refluxing the resulting HF vapors, then contacting the resulting solution with tin in the absence of oxidizing agent, withdrawing the resulting acid solution, cooling the withdrawn acid solution to crystallize stannous fluoride therefrom, and recovering the crystals formed from the residual acid liquid.

7. A process according to claim 6 wherein the said residual acid liquid is recirculated to said reaction zone.

8. A process according to claim 6 wherein said hydrofluoric acid is percolated downwardly through said tin shapes countercurrent to said air in said reaction zone and is recycled from the bottom to the top of said zone.

9. A process according to claim 6 wherein the stannous fluoride crystals separated from the residual acid liquid are washed with a substantially anhydrous $C_1$ to $C_3$ alkanol, and recovering stannous fluoride crystals having a purity of at least 99 percent.

References Cited in the file of this patent

UNITED STATES PATENTS 3,097,063    Gilliland et al. _____ July 9, 1963

OTHER REFERENCES

McPherson and Henderson Book "A Course in General Chemistry," 3rd Edition, 1927 (Ginn & Co., N.Y.), page 43.